US008482699B2

(12) United States Patent
Chang et al.

(10) Patent No.: US 8,482,699 B2
(45) Date of Patent: Jul. 9, 2013

(54) LIQUID CRYSTAL DISPLAY AND BACKLIGHT MODULE THEREOF

(75) Inventors: Chih-Chuan Chang, Taichung (TW); Yu-Tsung Huang, Taipei County (TW); Yao-Chi Liu, Miaoli County (TW)

(73) Assignee: Au Optronics Corporation, Hsinchu (TW)

( * ) Notice: Subject to any disclaimer, the term of this patent is extended or adjusted under 35 U.S.C. 154(b) by 290 days.

(21) Appl. No.: 12/969,599

(22) Filed: Dec. 16, 2010

(65) Prior Publication Data
US 2012/0086889 A1  Apr. 12, 2012

(30) Foreign Application Priority Data

Oct. 12, 2010  (TW) .............................. 99134788 A

(51) Int. Cl.
*G02F 1/1335* (2006.01)
(52) U.S. Cl.
USPC ............................. 349/65; 362/97.2; 362/609
(58) Field of Classification Search
USPC .................... 349/65, 67, 113, 150; 362/97.2, 362/609, 611, 612, 615, 631
See application file for complete search history.

(56) References Cited

U.S. PATENT DOCUMENTS

| 7,172,327 B2 * | 2/2007 | Kuo ............................... 362/609 |
| 7,697,087 B2 | 4/2010 | Chang | |
| 7,800,711 B2 * | 9/2010 | Kim ................................. 349/65 |
| 2008/0106913 A1 | 5/2008 | Ha | |
| 2011/0002141 A1 * | 1/2011 | Chang ........................... 362/606 |

FOREIGN PATENT DOCUMENTS

| CN | 101956926 | 1/2011 |
| TW | M289869 | 4/2006 |
| TW | I286644 | 9/2007 |
| TW | M365485 | 9/2009 |
| TW | I320122 | 2/2010 |
| TW | M375906 | 3/2010 |

OTHER PUBLICATIONS

"First Office Action of China Counterpart Application", issued on Feb. 17, 2012, p. 1-p. 3, in which the listed reference was cited.
"Office Action of Taiwan Counterpart Application", issued on May 13, 2013, p1-p7, in which the listed reference was cited.

* cited by examiner

*Primary Examiner* — Thoi Duong
(74) *Attorney, Agent, or Firm* — Jianq Chyun IP Office

(57) ABSTRACT

A backlight module includes an LGP and a linear light source. The LGP includes a light-incident side surface and a top light-emitting surface that has a peripheral region and an effective illumination region. The linear light source includes a circuit board, solid-state light-emitting devices configured on and electrically connected to the circuit board, and a reflector covering a portion of the peripheral region. Light emitted from each solid-state light-emitting device enters the LGP from the light-incident side surface. The reflector includes first reflection parts that correspond to the solid-state light-emitting devices and second reflection parts. Each second reflection part is connected to two adjacent first reflection parts. Each first reflection part and each second reflection part extend towards the effective illumination region from an edge of the top light-emitting surface. An extension length of each first reflection part is shorter than that of each second reflection part.

20 Claims, 6 Drawing Sheets

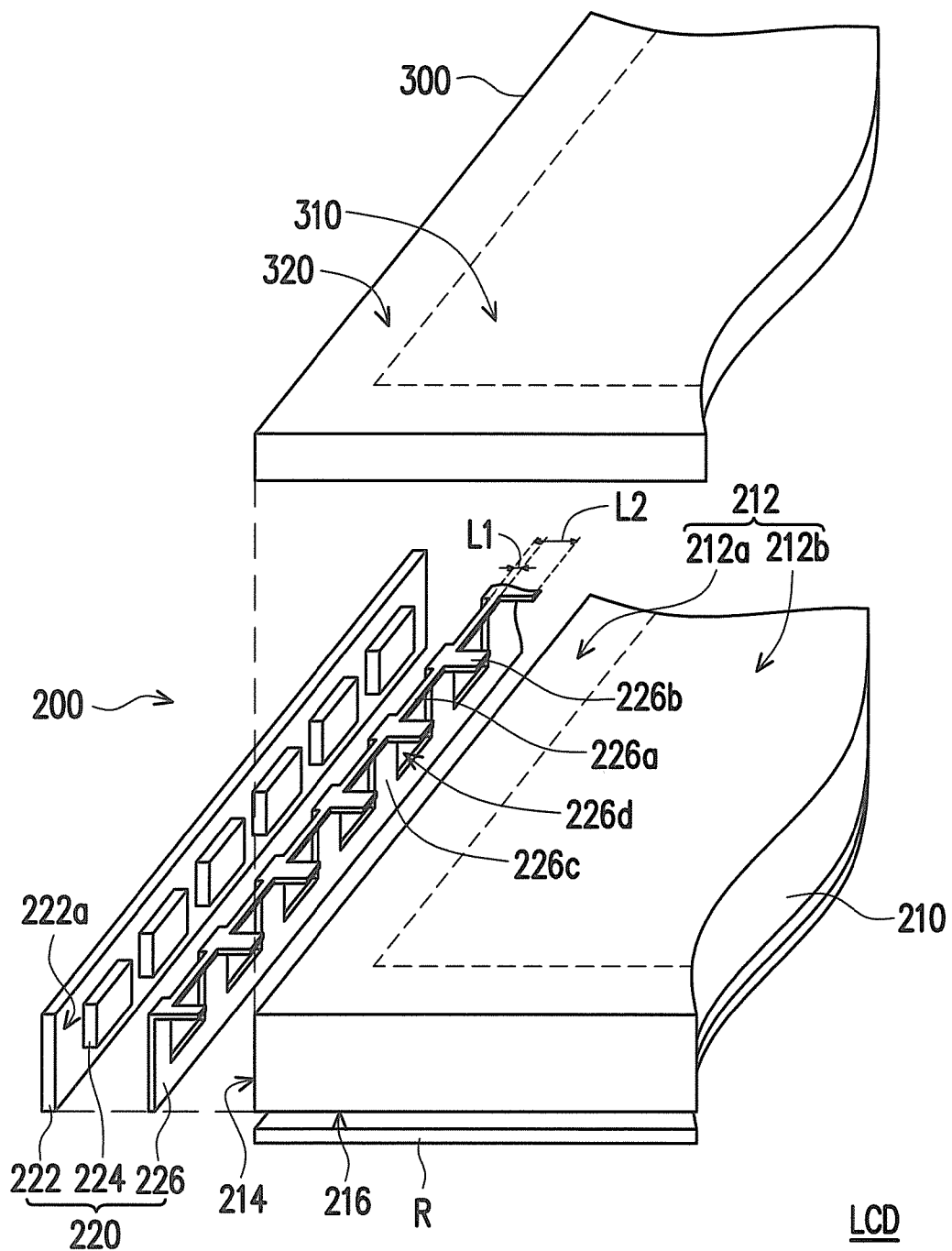

LIQUID CRYSTAL DISPLAY AND BACKLIGHT MODULE THEREOF

CROSS-REFERENCE TO RELATED APPLICATION

This application claims the priority benefit of Taiwan application serial no. 99134788, filed on Oct. 12, 2010. The entirety the above-mentioned patent application is hereby incorporated by reference herein and made a part of specification.

BACKGROUND OF THE INVENTION

1. Field of the Invention

The invention relates to a liquid crystal display (LCD), and more particularly to a backlight module.

2. Description of Related Art

In recent years, LCDs that have been developed toward full-color display gradually replace a conventional cathode ray tube (CRT) display and have become a main stream of displays in the market due to the advantages of a low operation voltage, non-radiation, light weight, small volume occupancy, and so forth.

The LCDs are non-self-illuminating displays, and therefore display functions of the LCDs are achieved when required light is provided by backlight modules. With increasing consciousness of environmental protection, cold cathode fluorescent lamps (CCFLs) serving as light-emitting devices in conventional backlight modules are gradually replaced by light-emitting diode (LED) devices because the LED devices are more friendly to environment. When an LED device is applied in the backlight module, e.g., an edge-type backlight module, the LED device is usually mounted on a bar-shaped printed circuit board (PCB) to form an LED light bar. The LED light bar is often electrically connected to a control circuit board through a flexible printed circuit (FPC).

FIG. 1 is a schematic top view illustrating a light guide plate (LGP) and an LED light bar in a conventional edge-type backlight module. With reference to FIG. 1, the conventional edge-type backlight module 100 includes an LGP 110 and a linear light source 120. The LGP 110 includes a top light-emitting surface 112 and a light-incident side surface 114 connected to the top light-emitting surface 112. The top light-emitting surface 112 has a peripheral region 112a and an effective illumination region 112b, and the peripheral region 112a is connected to the light-incident side surface 114. It can be learned from FIG. 1 that the linear light source 120 is configured next to the light-incident side surface 114. The linear light source 120 includes a circuit board 122 and a plurality of LED devices 124. Each of the LED devices 124 is configured on and electrically connected to the circuit board 122.

As shown in FIG. 1, a pitch between any two adjacent LED devices 124 of the linear light source 120 is P, and the shortest distance from the light-emitting surface of each of the LED devices 124 to the edge of the effective illumination region 112b is A. In order to uniformize the luminance of the effective illumination region 112b, users determine the optimal A/P ratio based on the divergence angle á of light of the LED devices 124. However, the LCD has been developed to comply with the requirement for the slim border design, and therefore the shortest distance A from the light-incident surface of each of the LED devices 124 to the edge of the effective illumination region 112b needs to be further shortened. When the A/P ratio is overly low, dark and bright hot spots are generated at the effective illumination region 112b close to the light-incident side surface 114. The dark regions shown in FIG. 1 refer to regions with low luminance. The hot spots can be removed by shortening the pitches P, while more of the LED devices 124 are required when the pitches P are shortened. As such, manufacturing costs are increased.

Accordingly, how to remove the hot spots caused by the overly low A/P ratio in compliance with the requirement for slim border design without significantly increasing the manufacturing costs now becomes an important issue to be resolved.

SUMMARY OF THE INVENTION

The invention is directed to a backlight module and an LCD having the backlight module.

The invention provides a backlight module that includes an LGP and a linear light source. The LGP includes a top light-emitting surface and a light-incident side surface connected to the top light-emitting surface. The top light-emitting surface has a peripheral region and an effective illumination region, and the peripheral region is connected to the light-incident side surface. The linear light source is configured next to the light-incident side surface and includes a circuit board, a plurality of solid-state light-emitting devices, and a reflector. The solid-state light-emitting devices are configured on and electrically connected to the circuit board. Besides, the solid-state light-emitting devices are located between the circuit board and the light-incident side surface. Light emitted from each of the solid-state light-emitting devices enters the LGP from the light-incident side surface. The reflector covers a portion of the peripheral region. The reflector includes a plurality of first reflection parts corresponding to the solid-state light-emitting devices and a plurality of second reflection parts. Each of the second reflection parts is connected to two of the first reflection parts adjacent thereto. Each of the first reflection parts and each of the second reflection parts extend towards the effective illumination region from an edge of the top light-emitting surface, and an extension length of each of the first reflection parts is shorter that that of each of the second reflection parts.

The invention further provides an LCD that includes the aforesaid backlight module and an LCD panel. The LCD panel is configured above the top light-emitting surface and has a display region and a peripheral circuit region. The display region is located above the effective illumination region of the LGP, and the peripheral circuit region is located above the peripheral region of the LGP.

According to an embodiment of the invention, the LGP has a scattering surface connected to the light-incident side surface, and the scattering surface is opposite to the top light-emitting surface.

According to an embodiment of the invention, the backlight module further includes a bottom reflector configured below the scattering surface.

According to an embodiment of the invention, the circuit board has a device-mounting surface, the solid-state light-emitting devices are configured on the device-mounting surface, and the device-mounting surface is substantially perpendicular to the top light-emitting surface.

According to an embodiment of the invention, the circuit board has a device-mounting surface, the solid-state light-emitting devices are configured on the device-mounting surface, and the device-mounting surface is substantially parallel to the light-incident side surface.

According to an embodiment of the invention, each of the solid-state light-emitting devices includes an LED device.

According to an embodiment of the invention, a width of each of the first reflection parts is substantially equal to a width of a corresponding one of the solid-state light-emitting devices, and a width of each of the second reflection parts is substantially equal to a spacing between any two adjacent solid-state light-emitting devices.

According to an embodiment of the invention, the first reflection parts and the second reflection parts are substantially parallel to the top light-emitting surface.

According to an embodiment of the invention, the reflector further includes an assembling portion connected to the linear light source. The assembling portion is connected to the first reflection parts and the second reflection parts. Besides, the assembling portion has a plurality of openings, and the solid-state light-emitting devices are embedded in the openings.

According to an embodiment of the invention, the assembling portion is connected to the circuit board.

According to an embodiment of the invention, the reflector further includes an assembling portion connected to the linear light source. The assembling portion is connected to the first reflection parts and the second reflection parts. Besides, the assembling portion includes a plurality of bar-shaped structures, and each of the solid-state light-emitting devices is respectively located between two of the bar-shaped structures adjacent thereto.

According to an embodiment of the invention, the bar-shaped structures are connected to the circuit board.

The reflector of the invention has the first reflection parts and the second reflection parts, and the extension length of each of the first reflection parts is different from the extension length of each of the second reflection parts. Through the second reflection parts, light distribution intensity between any two adjacent solid-state light-emitting devices can be effectively improved. As a result, the hot spots formed in the backlight module can be effectively removed.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 2' is a schematic view illustrating another LCD according to the first embodiment of the invention.

FIG. 4' is a schematic view illustrating another LCD according to the second embodiment of the invention.

DESCRIPTION OF EMBODIMENTS

First Embodiment

Figure 1:
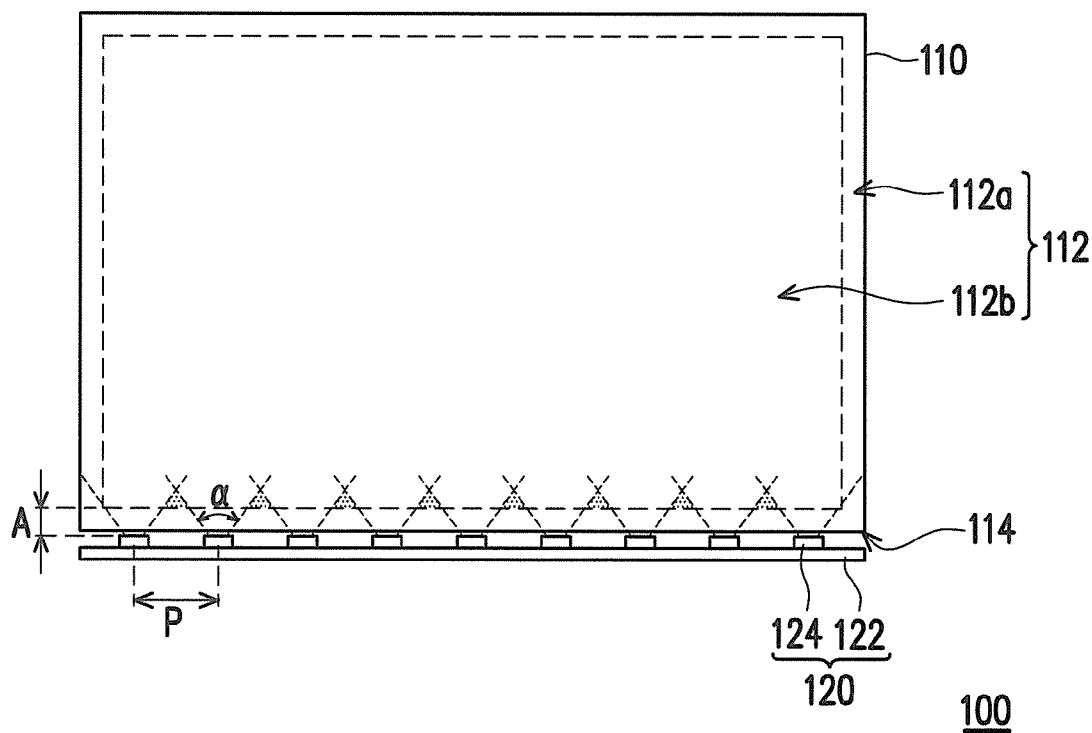
FIG. 1 is a schematic top view illustrating an LGP and an LED light bar in a conventional edge-type backlight module.
Figure 2:
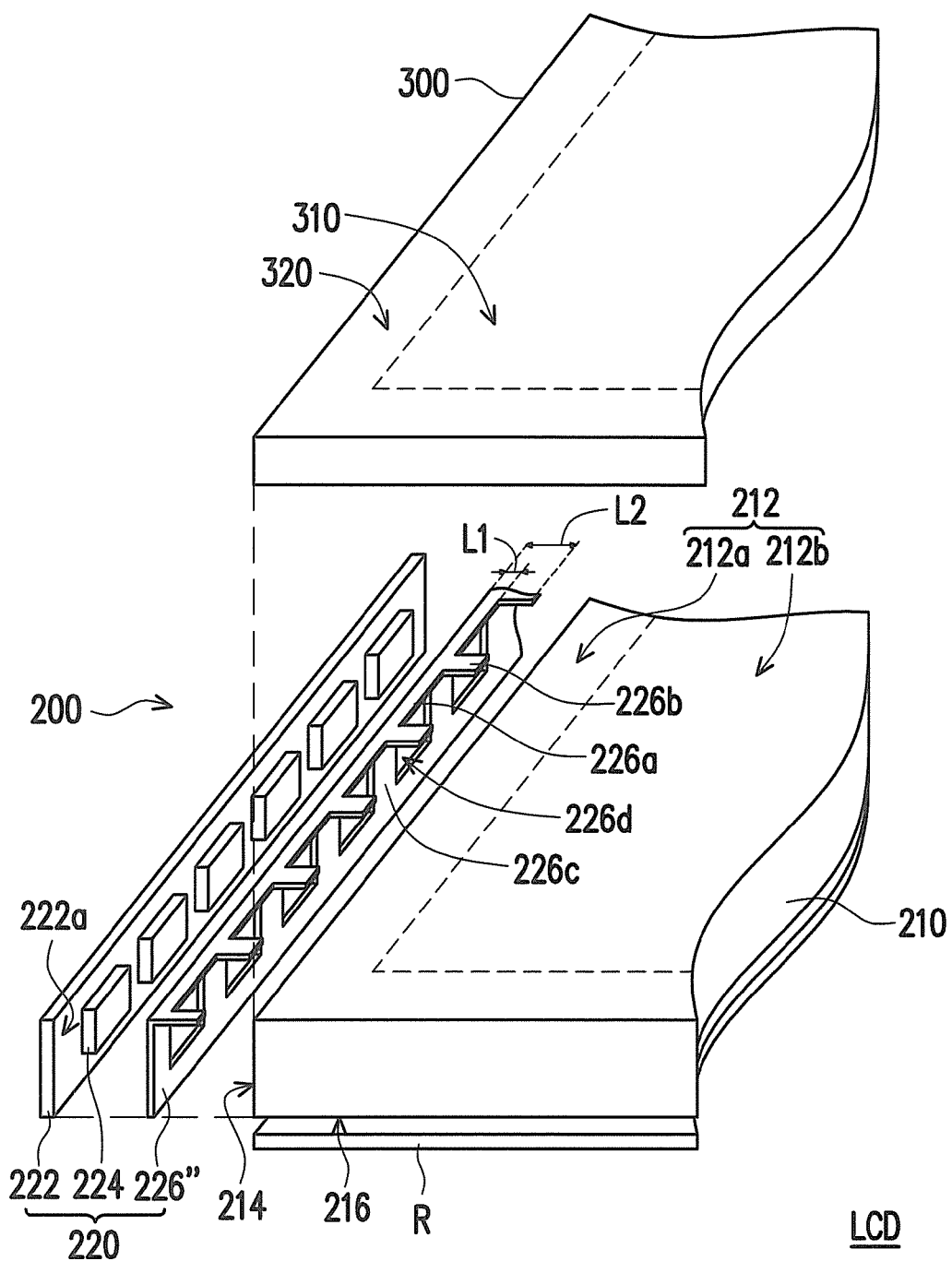
FIG. 2 is a schematic view illustrating an LCD according to a first embodiment of the invention.
Figure 3:
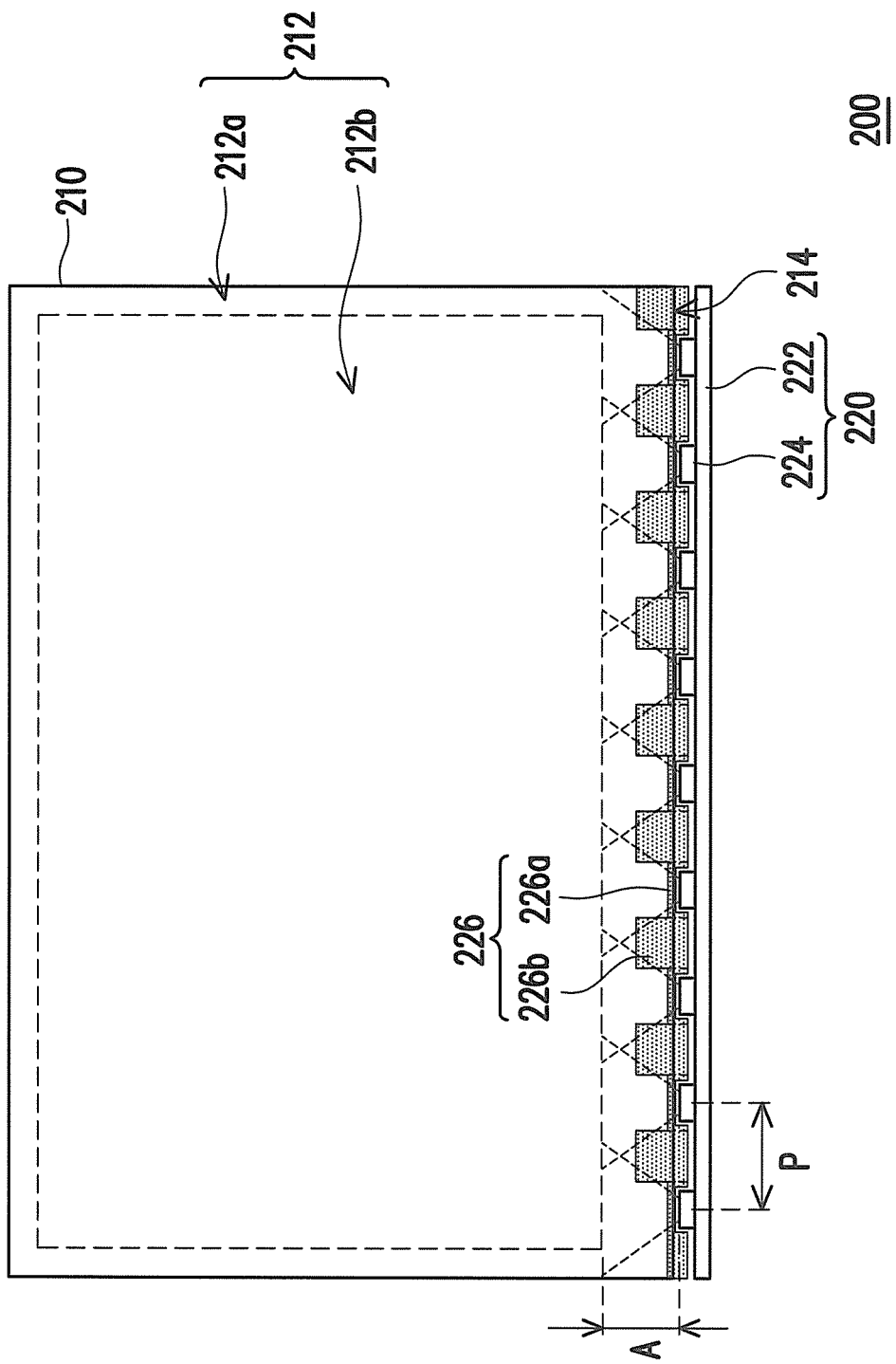
FIG. 3 is a schematic top view illustrating a backlight module according to the first embodiment of the invention.

FIG. 2 is a schematic view illustrating an LCD according to a first embodiment of the invention. FIG. 3 is a schematic top view illustrating a backlight module according to the first embodiment of the invention. With reference to FIG. 2, the LCD of this embodiment includes a backlight module 200 and an LCD panel 300. The LCD panel 300 is configured above the backlight module 200. In this embodiment, the LCD panel 300 is a transmissive LCD panel or a transflective LCD panel, for instance.

As shown in FIG. 2 and FIG. 3, the backlight module 200 includes an LGP 210 and a linear light source 220. The LGP 210 includes a top light-emitting surface 212 and a light-incident side surface 214 connected to the top light-emitting surface 212. The top light-emitting surface 212 has a peripheral region 212a and an effective illumination region 212b, and the peripheral region 212a is connected to the light-incident side surface 214. The linear light source 220 is configured next to the light-incident side surface 214 and includes a circuit board 222, a plurality of solid-state light-emitting devices 224, and a reflector 226. The solid-state light-emitting devices 224 are configured on and electrically connected to the circuit board 222. Besides, the solid-state light-emitting devices 224 are located between the circuit board 222 and the light-incident side surface 214. Light emitted from each of the solid-state light-emitting devices 224 enters the LGP 210 from the light-incident side surface 214. The reflector 226 covers a portion of the peripheral region 212a. The LCD panel 300 is located above the top light-emitting surface 212 of the LGP 210 and has a display region 310 and a peripheral circuit region 320. The display region 310 is located above the effective illumination region 212b of the LGP 210, and the peripheral circuit region 320 is located above the peripheral region 212a of the LGP 210.

It can be observed from FIG. 2 that the LGP 210 has a scattering surface 216 in addition to the top light-emitting surface 212 and the light-incident side surface 214. The scattering surface 216 is connected to the light-incident side surface 214 and opposite to the top light-emitting surface 212. In this embodiment, the scattering surface 216 has net points, V-shaped grooves, or other optical micro-structures that are arranged with certain density, such that the light entering the LGP 210 from the light-incident side surface 214 is apt to be scattered, and that the probability of emitting the light from the top light-emitting surface 214 can be increased. According to other embodiments of the invention, the backlight module 200 can selectively have a bottom reflector R located below the scattering surface 216, and thereby a portion of the light emitted out of the LGP 210 from the scattering surface 216 can be adequately reflected back to the LGP 210. As a result, the light utilization rate of the backlight module 200 can be increased.

The circuit board 222 has a device-mounting surface 222a. The solid-state light-emitting devices 224 are configured on the device-mounting surface 222a. The device-mounting surface 222a of the circuit board 222 is substantially perpendicular to the top light-emitting surface 212 of the LGP 210 and substantially parallel to the light-incident side surface 214 of the LGP 210. However, when the included angle between the top light-emitting surface 212 and the light-incident side surface 214 is not 90 degrees, the device-mounting surface 222a of the circuit board 222 is not necessarily perpendicular to the top light-emitting surface 212 of the LGP 210 and is not necessarily parallel to the light-incident side surface 214 of the LGP 210. Based on actual requirements for the products, the included angle between the device-mounting surface 222a and the top light-emitting surface 212 and the included angle between the device-mounting surface 222a and the light-incident side surface 214 can be properly modified. Here, the circuit board 222 is, for instance, an FR-4 printed circuit board (PCB), an FR-5 PCB, a metal core printed circuit board (MC-PCB), an FPC, and so on.

The solid-state light-emitting devices 224 of this embodiment are LED devices, for example. The LED devices can be surface mount device (SMD) type packages or other packages. In this embodiment, the LED devices are top emission LED devices, while other types of LED devices can be applied in other embodiments of the invention.

The reflector 226 includes a plurality of first reflection parts 226a and a plurality of second reflection parts 226b. The first reflection parts 226a correspond to the solid-state light-emitting devices 224. Each of the second reflection parts 226b is connected to two adjacent first reflection parts 226a. Each of the first reflection parts 226a and each of the second reflection parts 226b extend towards the effective illumination region 212b from an edge of the top light-emitting surface 212. An extension length L1 of each of the first reflection parts 226a is shorter than an extension length L2 of each of the second reflection parts 226b. For instance, a width of each of the first reflection parts 226a is substantially equal to a width of a corresponding one of the solid-state light-emitting devices 224, and a width of each of the second reflection parts 226b is substantially equal to a spacing between any two adjacent solid-state light-emitting devices 224. Certainly, the widths of the first and the second reflection parts 226a and 226b can be properly modified in this embodiment. For instance, the width of each of the first reflection parts 226a can be slightly greater than the width of the corresponding one of the solid-state light-emitting devices 224, and the width of each of the second reflection parts 226b can be slightly less than the spacing between any two adjacent solid-state light-emitting devices 224.

FIG. 2' is a schematic view illustrating another LCD according to the first embodiment of the invention. With reference to FIG. 2 and FIG. 2', the reflector 226" depicted in FIG. 2' is similar to the reflector 226 depicted in FIG. 2. The main difference therebetween lies in that the bent portion of the reflector 226 has a sawtooth-shaped edge, while the bent portion of the reflector 226" has a straight edge.

As clearly indicated in FIG. 2 and FIG. 3, the first reflection parts 226a and the second reflection parts 226b of the reflector 226 are on a plane that is substantially parallel to the top light-emitting surface 212. Besides, the first reflection parts 226a with relatively short lengths L1 can cover the solid-state light-emitting devices 224 to prevent light leakage; the second reflection parts 226b with relatively long lengths L2 can reduce the number of the hot spots mentioned in the related art. To be more specific, the portion of the peripheral region 212a covered by the second reflection parts 226b is greater than the portion of the peripheral region 212a covered by the first reflection parts 226a. Accordingly, the second reflection parts 226b can increase the light distribution intensity between any two adjacent solid-state light-emitting devices 224 and further preclude formation of the hot spots. When the hot spots no longer exist because of the second reflection parts 226b, the shortest distance A from the light-emitting surface of each of the LED devices 224 to an edge of the effective illumination region 212b can be further shortened. Namely, the shortest distance A from the light-emitting surface of each of the LED devices 224 to an edge of the display region 310 can be further reduced, so as to satisfy the requirement for slim border design.

The reflector 226 of this embodiment not only has the first and the second reflection parts 226a and 226b but also has an assembling portion 226c connected to the linear light source 220. The assembling portion 226c is connected to the first and the second reflection parts 226a and 226b and has a plurality of openings 226d. The solid-state light-emitting devices 224 are embedded in the openings 226d of the assembling portion 226c. Here, the assembling portion 226c is fixed onto the circuit board 222 by means of adhesives or in other manner.

The reflector 226 of this embodiment is formed by cutting and bending one piece of plate. That is to say, the first reflection parts 226a, the second reflection parts 226b, and the assembling portion 226c are made of the same material, e.g., a white reflective material or a silver reflective material. The shape of the first reflection parts 226a, the second reflection parts 226b, and the assembling portion 226c can be determined based on the aforesaid cutting and bending process.

Second Embodiment

Figure 4:
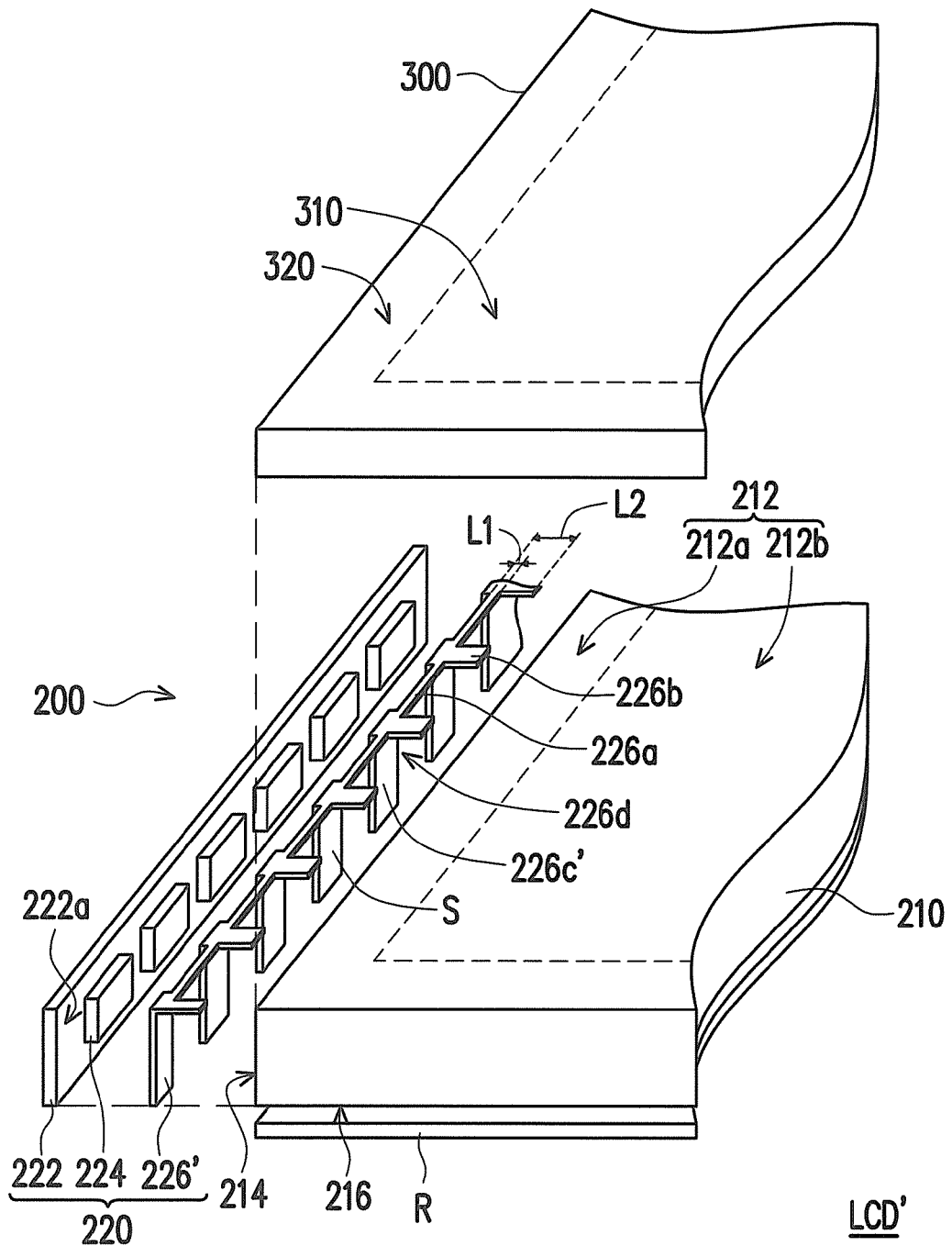
FIG. 4 is a schematic view illustrating an LCD according to a second embodiment of the invention.
Figure 4:
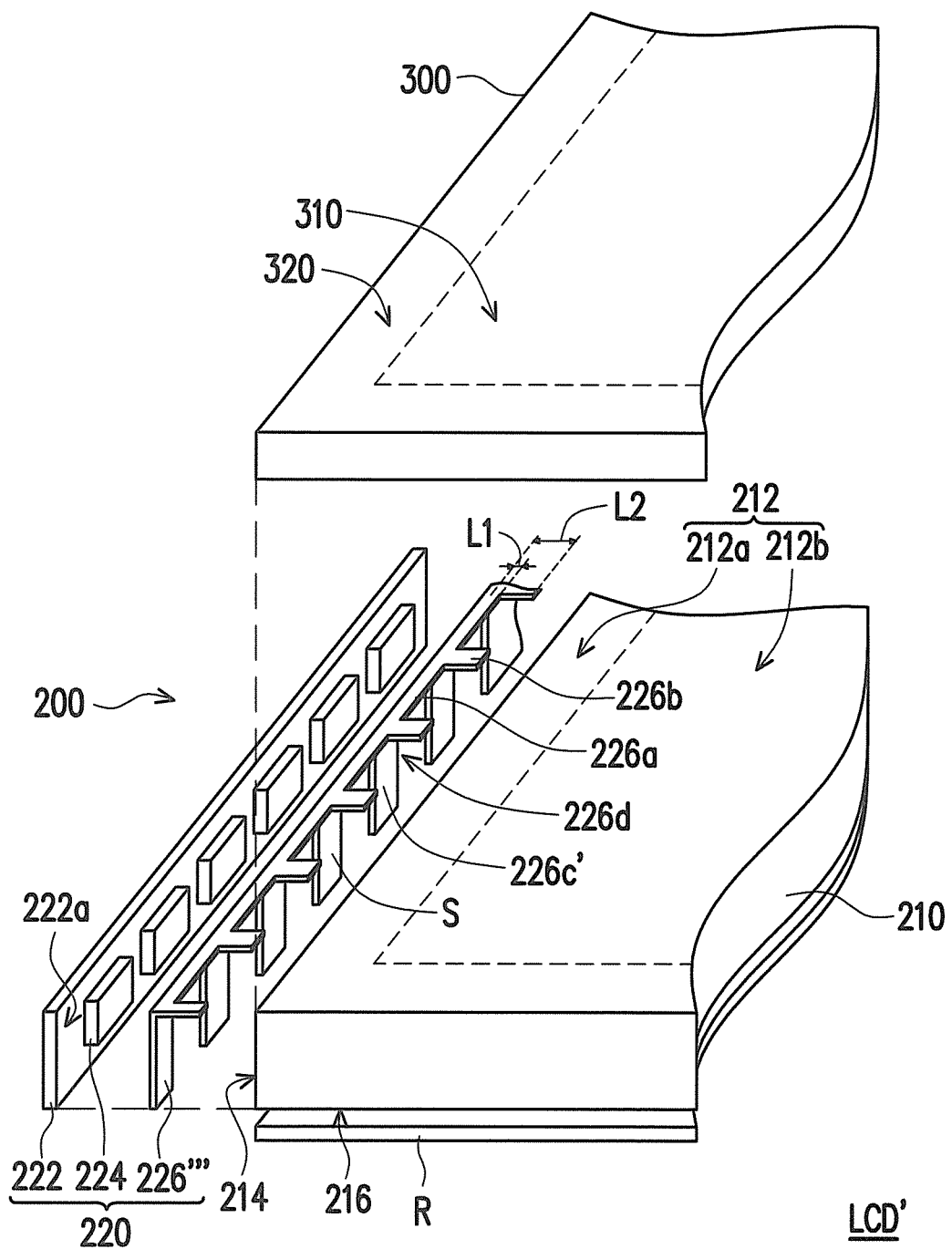

FIG. 4 is a schematic view illustrating an LCD according to a second embodiment of the invention. With reference to FIG. 4, the LCD' of this embodiment is similar to the LCD of the first embodiment, while the main difference therebetween rests in that the reflector 226' of this embodiment includes the first reflection parts 226a, the second reflection parts 226b, and an assembling portion 226c' that is connected to the linear light source 220. The assembling portion 226c' is connected to the first and the second reflection parts 226a and 226b and includes a plurality of bar-shaped structures S. Each of the solid-state light-emitting devices 224 is respectively located between two of the bar-shaped structures S adjacent thereto. Here, the assembling portion 226c' is fixed onto the circuit board 222 by means of adhesives or in other manner.

FIG. 4' is a schematic view illustrating another LCD according to the second embodiment of the invention. With reference to FIG. 4 and FIG. 4', the reflector 226''' depicted in FIG. 4' is similar to the reflector 226' depicted in FIG. 4. The main difference therebetween lies in that the bent portion of the reflector 226' has a sawtooth-shaped edge, while the bent portion of the reflector 226''' has a straight edge.

The reflector described in the previous embodiments of the invention has the first reflection parts and the second reflection parts, and the extension length of each of the first reflection parts is different from the extension length of each of the second reflection parts. Through the second reflection parts, the light distribution intensity between any two adjacent solid-state light-emitting devices can be effectively improved. As a result, the hot spots formed in the backlight module can be effectively removed.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A backlight module comprising:
    a light guide plate comprising a top light-emitting surface and a light-incident side surface connected to the top light-emitting surface, the top light-emitting surface having a peripheral region and an effective illumination region, the peripheral region and the light-incident side surface being adjoined;
    a linear light source configured next to the light-incident side surface and comprising:
        a circuit board;
        a plurality of solid-state light-emitting devices configured on and electrically connected to the circuit board, the solid-state light-emitting devices being located between the circuit board and the light-incident side surface of the light guide plate, light emitted from each of the solid-state light-emitting devices entering the light guide plate from the light-incident side surface; and a reflector covering a portion of the peripheral region and comprising a plurality of first reflection parts and a plurality of second reflection parts, the first reflection parts corresponding to the solid-state light-emitting devices, each of the second reflection parts being connected to the two adjacent first reflection parts, each of the first reflection parts and each of the second reflection parts extending towards the effective illumination region from an edge of the top light-emitting surface, an extension length of each of the first reflection parts being shorter than an extension length of each of the second reflection parts.

2. The backlight module as claimed in claim 1, wherein the light guide plate has a scattering surface connected to the light-incident side surface, and the scattering surface is opposite to the top light-emitting surface.

3. The backlight module as claimed in claim 2, further comprising a bottom reflector configured below the scattering surface.

4. The backlight module as claimed in claim 1, wherein the circuit board has a device-mounting surface, the solid-state light-emitting devices are configured on the device-mounting surface, and the device-mounting surface is substantially perpendicular to the top light-emitting surface.

5. The backlight module as claimed in claim 1, wherein the circuit board has a device-mounting surface, the solid-state light-emitting devices are configured on the device-mounting surface, and the device-mounting surface is substantially parallel to the light-incident side surface.

6. The backlight module as claimed in claim 1, wherein each of the solid-state light-emitting devices comprises a light-emitting diode device.

7. The backlight module as claimed in claim 1, wherein a width of each of the first reflection parts is substantially equal to a width of a corresponding one of the solid-state light-emitting devices, and a width of each of the second reflection parts is substantially equal to a spacing between any two adjacent solid-state light-emitting devices.

8. The backlight module as claimed in claim 1, wherein the first reflection parts and the second reflection parts are substantially parallel to the top light-emitting surface.

9. The backlight module as claimed in claim 1, wherein the reflector further comprises an assembling portion connected to the linear light source, the assembling portion is connected to the first reflection parts and the second reflection parts and has a plurality of openings, and the solid-state light-emitting devices are embedded in the openings.

10. The backlight module as claimed in claim 9, wherein the assembling portion is connected to the circuit board.

11. The backlight module as claimed in claim 1, wherein the reflector further comprises an assembling portion connected to the linear light source, the assembling portion is connected to the first reflection parts and the second reflection parts and includes a plurality of bar-shaped structures, and each of the solid-state light-emitting devices is respectively located between two of the bar-shaped structures adjacent thereto.

12. The backlight module as claimed in claim 11, wherein the bar-shaped structures are connected to the circuit board.

13. A liquid crystal display comprising:
a backlight module as claimed in claim 1; and
a liquid crystal display panel configured above the top light-emitting surface and having a display region and a peripheral circuit region, the display region being located above the effective illumination region, the peripheral circuit region being located above the peripheral region of the light guide plate.

14. The liquid crystal display as claimed in claim 13, wherein the light guide plate has a scattering surface connected to the light-incident side surface, and the scattering surface is opposite to the top light-emitting surface.

15. The liquid crystal display as claimed in claim 13, wherein the circuit board has a device-mounting surface, the solid-state light-emitting devices are configured on the device-mounting surface, and the device-mounting surface is substantially perpendicular to the top light-emitting surface.

16. The liquid crystal display as claimed in claim 13, wherein the circuit board has a device-mounting surface, the solid-state light-emitting devices are configured on the device-mounting surface, and the device-mounting surface is substantially parallel to the light-incident side surface.

17. The liquid crystal display as claimed in claim 13, wherein a width of each of the first reflection parts is substantially equal to a width of a corresponding one of the solid-state light-emitting devices, and a width of each of the second reflection parts is substantially equal to a spacing between any two adjacent solid-state light-emitting devices of the solid-state light-emitting devices.

18. The liquid crystal display as claimed in claim 13, wherein the first reflection parts and the second reflection parts are substantially parallel to the top light-emitting surface.

19. The liquid crystal display as claimed in claim 13, wherein the reflector further comprises an assembling portion connected to the linear light source, the assembling portion is connected to the first reflection parts and the second reflection parts and has a plurality of openings, and the solid-state light-emitting devices are embedded in the openings.

20. The liquid crystal display as claimed in claim 13, wherein the reflector further comprises an assembling portion connected to the linear light source, the assembling portion is connected to the first reflection parts and the second reflection parts and includes a plurality of bar-shaped structures, and each of the solid-state light-emitting devices is respectively located between two of the bar-shaped structures adjacent thereto.

* * * * *